June 25, 1935.                E. A. ROWE ET AL                2,006,001
                             APPARATUS FOR ANNEALING
                              Filed Sept. 10, 1934

Inventors
Eugene A. Rowe
Samuel H. Edwards
Francis N. Fossati

By: J. H. Adams
      Attorney

Patented June 25, 1935

2,006,001

UNITED STATES PATENT OFFICE 2,006,001

APPARATUS FOR ANNEALING

Eugene A. Rowe, San Francisco, and Samuel H. Edwards and Francis N. Fossati, Richmond, Calif., assignors to Standard Oil Company of California, San Francisco, Calif., a corporation of Delaware Application September 10, 1934, Serial No. 743,320

6 Claims. (Cl. 263—5)

This invention relates to the art of annealing metallic bodies on which work such as electric arc welding has been done, and in which the internal stresses set up thereby have not been relieved, and more particularly relates to a method and apparatus for annealing or stress-relieving circumferential welded joints between adjacent cylindrical sections of steel pipe, cylinders, penstocks, and the like, which may be of large diameter and of appreciable plate thickness.

It is a well known fact that welds and particularly electric arc welds normally contain locked-up or internal stresses, apparently chiefly due to contraction of the metal upon cooling. These stresses may be so small as to be harmless; on the other hand, they may be of such magnitude as to be dangerous if they are not relieved. This is particularly true in the case of field girth or circumferential welds in pipe of large sizes, where failures due to this cause have occurred.

Because of the lack of a practical field method of stress relief it has often been necessary to avoid the use of welding and, instead, employ some otherwise less desirable process. A good example of this is the large penstock pipe, 30 feet in diameter, at Boulder Dam. Here the individual cylindrical sections of pipe were fabricated, using the very highest type of electric arc welding and were totally annealed or stress relieved in the shop. However, rather than risk failure of the circumferential field welds joining adjacent cylindrical sections, in the absence of an acceptable and proven method of field stress relieving, these circumferential joints were made by a less desirable method of special riveting which was expensive and required working out a particular design and method of handling.

An acceptable method and apparatus for stress relief of this nature under field conditions should have the following characteristics:

(a) It should be able to attain and hold a temperature of 1000° to 1200° F. (A. S. M. E. requirement for stress relief of Class I steel pressure vessels is 1100° F.).

(b) The heating process should be uniformly directed to the proper areas and should proceed at an adequate rate.

(c) The heating equipment or apparatus should be of such construction as to be readily installed and removed and preferably should be sectionalized so as to be readily portable.

(d) The apparatus should be simple, rugged, and adapted to be operated satisfactorily by relatively unskilled operators, and should not be seriously affected by adverse atmospheric conditions.

(e) The apparatus should be adapted to utilize an easily available and portable fuel supply, and should utilize a minimum quantity of the said fuel.

These are the principal objects which it is desired to accomplish by this invention, which appears to reside in the steps of providing a plurality of burners around the circumferential seam to be annealed and so directing and confining the heated products of combustion that a continuous circulation is established around the cylindrical structure, to uniformly and quickly heat the same to the desired temperature. The preferred means for accomplishing this process may consist of a plurality of overlapping or at least adjoining sectional shields, adapted to be secured together and around the structure to direct and uniformly confine the circulation of the hot gases of combustion to those portions which are to be heated.

The invention itself, however, both as to its organization and its method of operation, together with additional objects and advantages thereof, will best be understood from the description which follows, and from the accompanying drawing, which forms a part of this specification and illustrates a preferred embodiment of the said invention.

Figure 3:
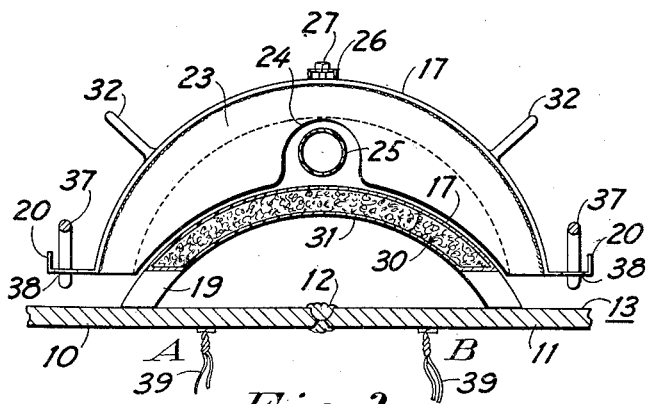
Figure 3 is a sectional elevation on line III—III of Figure 2, and illustrates the overlapping ends of the adjacent sections with the latter centered over the weld.

Referring to the drawing, the cylindrical sections 10 and 11 have previously been welded together, as by the electric arc process, at 12 to form a pipe 13. The stresses set up during the welding operations and the subsequent cooling are ordinarily within the circumferential strip A—B (Figure 3), and that portion is substantially spanned by the sectional heating units or shields 14, 15, 16, as shown. Each shield is identical with all the others, and enough are provided to completely encircle the pipe 13, thus forming a continuous passage or duct, into which a plurality of burners may direct hot gases, as will be described below.

Shield 14 may be taken as typical, and comprises a relatively short semicylindrical steel shell 17, cut at an angle to its axis, as shown, thus providing one large and one small end, to facilitate overlapping. The small end 18, is extended as at 19 to provide legs which contact the pipe 13. Flanged guards 20 extend from legs 19 to the large end 21 of the shield and serve to support the large end 21 in a spaced relation to the pipe surface by virtue of the clamping means generally designated 22.

The large end 21 of shield 14 may be provided with a filler plate 23, (Figure 3) which plate is adapted to conform substantially to the shape of the small end of the next adjacent shield 15, and is also cut out as at 24 to receive the hot gases from burner 25.

Burner 25 is preferably adjustably supported from shield 14 as by bracket 26, secured to shell 17 by bolts 27. Burner 25 may be of any suitable type, such as the one disclosed in the copending patent application of Eugene A. Rowe et al., Serial No. 598,688, filed March 14, 1932, which issued February 17, 1935 as Patent No. 1,991,418. That burner is particularly adapted to utilize liquefied petroleum gases under pressures ranging from 5 to 150 pounds per square inch. Liquefied petroleum gases are commonly available in steel tanks or bottles which are readily portable, and constitute an almost ideal fuel for an apparatus of this nature, which may be used at remote and inaccessible locations where transportation is difficult and expensive. These gases are in liquid form in the tank, but pass into the gaseous phase as the pressure is reduced, maintaining a constant pressure supply as long as any liquid remains. Under some circumstances a preheater may be required to insure complete gasification of the fuel, particularly at high rates of fuel withdrawal.

The fuel supply to burner 25 may conveniently be such a bottle or tank of liquefied petroleum gas (not shown) and may be piped to the burners by means of the tubing 28 fitted with branches 29. Inasmuch as all the burners ordinarily require the same amount of gas, no particular regulating equipment need be provided at the branches 29, the conventional pressure reducing valve at the storage tank (not shown) giving adequate control.

Each shield may be insulated throughout its length to prevent excessive radiation losses by suitable insulating material 30, such as rock wool, which is held in place by a lining 31 of heat resisting material such as "18—8" chromium nickel iron alloy, welded to shell 17. Other refractory linings may be used, but are ordinarily heavier than this arrangement. Handles 32 are provided to facilitate handling of the individual unit shields.

Figure 1:
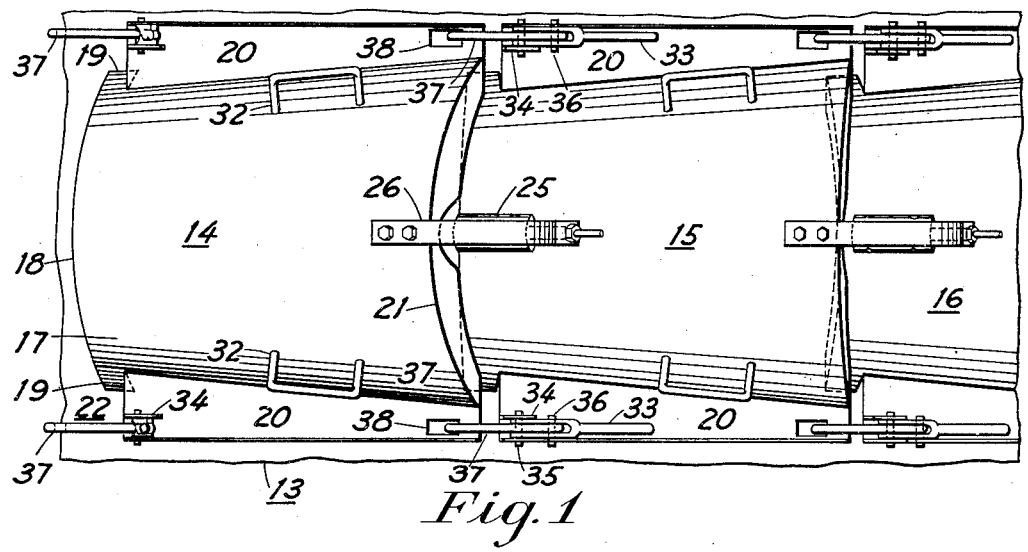
Figure 1 is a plan view of a portion of a cylindrical body which has been joined by a circumferential weld, and shows several sectional shields in place thereon.
Figure 2:
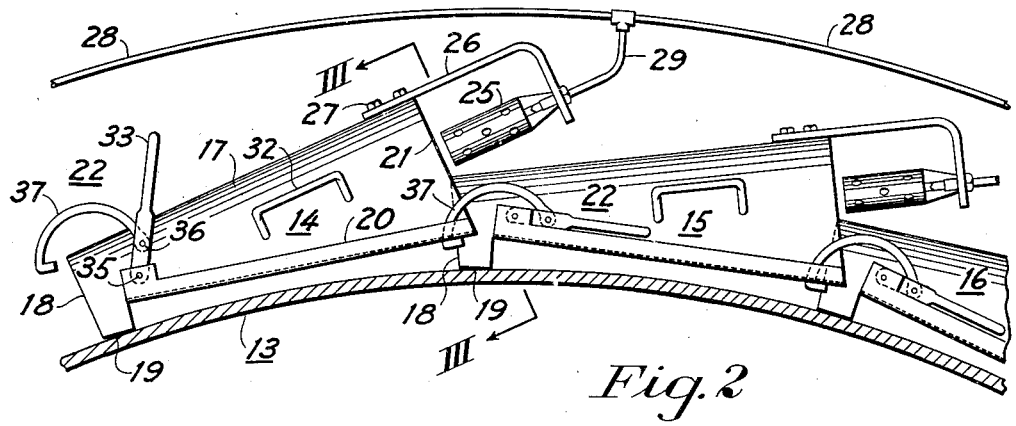
Figure 2 is a side view of the arrangement shown in Figure 1, the portion of the cylindrical body being shown in section.

Clamping means generally designated 22 are provided to detachably secure the adjacent shields 14, 15, 16, etc., together, and one form which may be used is illustrated in Figures 1 and 2. Each unit comprises a bifurcated toggle lever 33, supported from the flanged guard 20 and bracket 34 by pin 35. Spaced from pin 35 is a second pin 36, on which an arcuate spring steel clamp member 37 is pivoted. Member 37 is adapted to engage a slot 38 in the flanged guard 20 of the next adjacent shield. It will be noted that these clamping means 22 are self-locking by virtue of the toggle arrangement (Figure 2) and inasmuch as clamp member 37 is a segment of a spring, the separate unit shields are securely and resiliently connected and held in place on the pipe 13.

As stated above, the large end 21 of each shield 14, 15, 16 is spaced from the pipe by the flanged guard 20 and clamping means 22. This provides a substantially continuous restricted side outlet beneath the edges of the chain of shields, for the escape of the excess products of combustion from burners 25. It is obvious, however, that other types of construction could be employed to obtain the same or equivalent result.

The method of operation of the invention is believed to be evident from the drawing and from the foregoing description of one embodiment thereof. The unit shields are secured together around the pipe over the weld to be annealed or stress-relieved. The burners are lighted and positioned to direct the resulting products of combustion tangentially into the respective shields, which latter provide a radial restriction or confinement, thus setting up a rapid and continuous circulation of hot gases completely around the periphery of pipe, causing it to be uniformly heated to the desired degree and for the length of time required. Excess products of combustion and the cooled gases leave the system through the outlets beneath the edges of the shields.

The temperature required to anneal or stress-relieve a steel pipe of this type has been found to be about 1000° to 1200° F., maintained for about one hour. An apparatus constructed according to this invention, and applied to a 6 foot diameter pipe made of 1 inch thick steel plate, heated a 16 inch width at the welded joint between two sections to a temperature of 1100° F., with a maximum temperature variation in a circumferential direction of 130° F. That temperature was reached in about one hour and about 120 pounds per hour of liquefied petroleum gas was consumed under a pressure of about 20 pounds per square inch. The temperature was found to rise to the desired point and then remain substantially constant, without alteration to the gas supply. Temperatures were measured by conventional thermocouples 39 secured to the inside or unfired side of the pipe 13.

Although a specific construction embodying this invention has been described and illustrated, it is to be understood that the invention is not limited to that specific device or its method of operation, and all such modifications and changes as come within the scope of the appended claims are embraced thereby.

We claim:

1. In an apparatus of the type described, a relatively short, shallow, channel shaped shield, one end of which is larger than the other and is provided with a filler plate adapted to overlap the smaller end of a similar shield, an opening in said filler plate, a burner mounted on said shield and adapted to direct a stream of hot gases through the opening in said filler plate into the interior of said shield, and means for clamping said shield to a second shield in overlapping relation.

2. In an apparatus of the character described, a relatively short, shallow, channel shaped shield, one end of which is larger than the other and is adapted to overlap the smaller end of a similar shield, means comprising a burner adapted to direct a stream of hot gases into the larger end of said shield, and means for securing said shield to a second shield in overlapping relation.

3. An apparatus according to claim 2, with the addition of means for spacing the edges of said shield from the surface to be heated.

4. An apparatus according to claim 2, in which said clamping means constitutes a toggle lever fitted with a resilient clamping member to engage said second shield.

5. An apparatus according to claim 2, with the addition of a layer of insulation inside the body of said shield and a metallic heat resisting lining for said insulation, to prevent deterioration thereof.

6. An apparatus for annealing circumferential welds in cylindrical bodies such as pipe, comprising a plurality of relatively short, shallow, channel shaped shields, each of which has one end larger than the other whereby they may be assembled around the said body in overlapping relation to form a substantially continuous duct, a plurality of burners adapted to direct hot gases into the larger ends of said shields, and means for detachably securing said shields together about the said body.

EUGENE A. ROWE.
SAMUEL H. EDWARDS.
FRANCIS N. FOSSATI.